(12) United States Patent
Roman et al.

(10) Patent No.: US 12,174,149 B2
(45) Date of Patent: Dec. 24, 2024

(54) VARIABLE SHAPE SENSING ELEMENT OF A MAGNETOSTRICTIVE OSCILLATING ICE DETECTOR SENSOR FOR IMPROVED ICE COLLECTION EFFICIENCY USING ADDITIVE MANUFACTURING

(71) Applicant: Rosemount Aerospace Inc., Burnsville, MN (US)

(72) Inventors: Jamison K. Roman, Elko New Market, MN (US); Marc Regan, Chaska, MN (US); Jeremiah Schweitzer, Woodbury, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 66 days.

(21) Appl. No.: 17/820,784

(22) Filed: Aug. 18, 2022

(65) Prior Publication Data

US 2024/0060936 A1 Feb. 22, 2024

(51) Int. Cl.
*B64D 15/12* (2006.01)
*G01N 29/22* (2006.01)

(52) U.S. Cl.
CPC ........... *G01N 29/222* (2013.01); *B64D 15/12* (2013.01); *G01N 2291/0251* (2013.01)

(58) Field of Classification Search
CPC .............................. G01N 29/222; B64D 15/12
See application file for complete search history.

(56) References Cited

U.S. PATENT DOCUMENTS

| | | | |
|---|---|---|---|
| 3,341,835 A * | 9/1967 | Werner ................... | G01W 1/14 340/582 |
| 3,541,540 A * | 11/1970 | Hughes ................... | B64D 15/20 73/661 |
| 5,229,779 A | 7/1993 | Du | |
| 6,269,320 B1 | 7/2001 | Otto | |
| 6,320,511 B1 | 11/2001 | Cronin et al. | |
| 6,759,962 B2 * | 7/2004 | Severson ............... | G08B 19/02 340/580 |
| RE39,295 E | 9/2006 | Cronin et al. | |
| 7,104,502 B2 | 9/2006 | Otto et al. | |
| 9,612,163 B2 | 4/2017 | Meis et al. | |
| 9,664,542 B2 | 5/2017 | Gordon et al. | |
| 9,970,824 B2 | 5/2018 | Cheung et al. | |
| 10,099,791 B2 * | 10/2018 | Borigo ................... | B64D 15/20 |
| 10,435,161 B1 | 10/2019 | Lopresto et al. | |

(Continued)

FOREIGN PATENT DOCUMENTS

EP 3009847 B1 8/2017

OTHER PUBLICATIONS

Nakajima Kenya et al: "Additive Manufacturing of Magnetostrictive Fe—Co Alloys", Materials, vol. 15, No. 3, Jan. 18, 2022 (Jan. 18, 2022), p. 709.*

(Continued)

*Primary Examiner* — Justin M Benedik
(74) *Attorney, Agent, or Firm* — Kinney & Lange, P.A.

(57) ABSTRACT

A probe head of a magnetostrictive oscillator includes a base and a plurality of hollow protrusions extending from the base. Each protrusion of the plurality of hollow protrusions includes a first end and a second end opposite the first end. The second end is connected to the base. Each protrusion also includes an inner side and an outer side opposite the inner side.

17 Claims, 9 Drawing Sheets

(56) References Cited

U.S. PATENT DOCUMENTS

| | | |
|---|---|---|
| 10,450,075 B2 | 10/2019 | Roman et al. |
| 10,967,627 B2 | 4/2021 | Nino et al. |
| 2004/0231410 A1* | 11/2004 | Bernard ................ B64D 15/20 73/170.26 |
| 2005/0230553 A1 | 10/2005 | Otto et al. |
| 2015/0093244 A1 | 4/2015 | Wigen |
| 2015/0103867 A1 | 4/2015 | Meis et al. |
| 2016/0304210 A1 | 10/2016 | Wentland et al. |
| 2017/0313429 A1 | 11/2017 | Jackson |
| 2018/0136249 A1 | 5/2018 | Krueger et al. |
| 2020/0055143 A1 | 2/2020 | Poprawe et al. |
| 2020/0393484 A1 | 12/2020 | Johnson et al. |
| 2021/0009273 A1 | 1/2021 | Botura et al. |
| 2021/0055143 A1 | 2/2021 | Wigen et al. |
| 2022/0118683 A1 | 4/2022 | Wigen et al. |
| 2023/0128806 A1 | 4/2023 | Zheng et al. |

OTHER PUBLICATIONS

Extended European Search Report dated Jan. 3, 2024 for corresponding European Application No. 23191088.6.

Bai, Hao, et al., "Efficient water collection on integrative bioinspired surfaces with star-shaped wettability patterns", Hao Bai et al., "Efficient water collection on integrative bioinspired surfaces with star-shaped wettability patterns." Advanced Materials 26, No. 29 (2014): pp. 5025-5030., 2014, 5025-5030.

Extended European Search Report dated Dec. 1, 2023, for corresponding European Patent Application No. 23179336.5.

Extended European Search Report dated Oct. 9, 2023, for corresponding European Application No. 23179626.9.

\* cited by examiner

VARIABLE SHAPE SENSING ELEMENT OF A MAGNETOSTRICTIVE OSCILLATING ICE DETECTOR SENSOR FOR IMPROVED ICE COLLECTION EFFICIENCY USING ADDITIVE MANUFACTURING

BACKGROUND

The present disclosure relates to aircraft sensors, and in particular, to magnetostrictive oscillating (MSO) ice detector (ID) sensors.

Aircraft sensors are important to proper operation of aircraft. Among these aircraft sensors are MSO ID sensors which collect and detect liquid ice (supercooled water droplets) during flight. MSO ID sensors can further detect the rate of ice accretion on an aircraft. Accurate information from these sensors is important to proper operation of the aircraft. During operation, these sensors accumulate ice on a detector probe and strut. Smaller droplets accumulate on the detector probe less readily than larger droplets. Further, increasing the ice formation rate improves the performance of the sensing device. Therefore, solutions to increase the propensity of small droplet accumulation and increase ice formation rates are desired.

SUMMARY

In one embodiment, a probe head of a magnetostrictive oscillator includes a base and a plurality of hollow protrusions extending from the base. Each protrusion of the plurality of hollow protrusions includes a first end and a second end opposite the first end. The second end is connected to the base. Each protrusion also includes an inner side and an outer side opposite the inner side.

In another embodiment, a method of forming a probe head of a magnetostrictive oscillator includes depositing a base layer. Depositing the base layer includes depositing a first layer of powder of a first material and sintering a portion of the first layer of powder. The method further includes depositing a probe head layer, which includes depositing a second layer of powder on the base layer, wherein the second layer of powder is a second material. A plurality of different points of the second layer of powder is sintered to form a plurality of protrusions. The method further includes removing any powder from the first layer of powder and the second layer of powder that was not sintered.

In another embodiment, an ice detector includes a mounting base, a support strut connected to the mounting base, and a magnetostrictive oscillator probe head. The magnetostrictive oscillator probe head is connected to the support strut opposite the mounting base. The magnetostrictive oscillator probe head includes a plurality of hollow protrusions.

DETAILED DESCRIPTION

This disclosure relates to a probe head for an ice detector, and in particular to a magnetostrictive probe head for a magnetostrictive oscillating (MSO) ice detector (ID) sensor on an aircraft to detect the accumulation rate of super cooled water droplets. The probe head can be an additively manufactured head that includes a plurality of protrusions. Each protrusion can have a shape which improves local collection efficiency, and the plurality of protrusions can have an increased surface area or a specific distribution pattern which improves the overall collection efficiency. The ice detector and embodiments of alternative probe heads will be discussed with reference to FIGS. 1-8.

Figure 1:
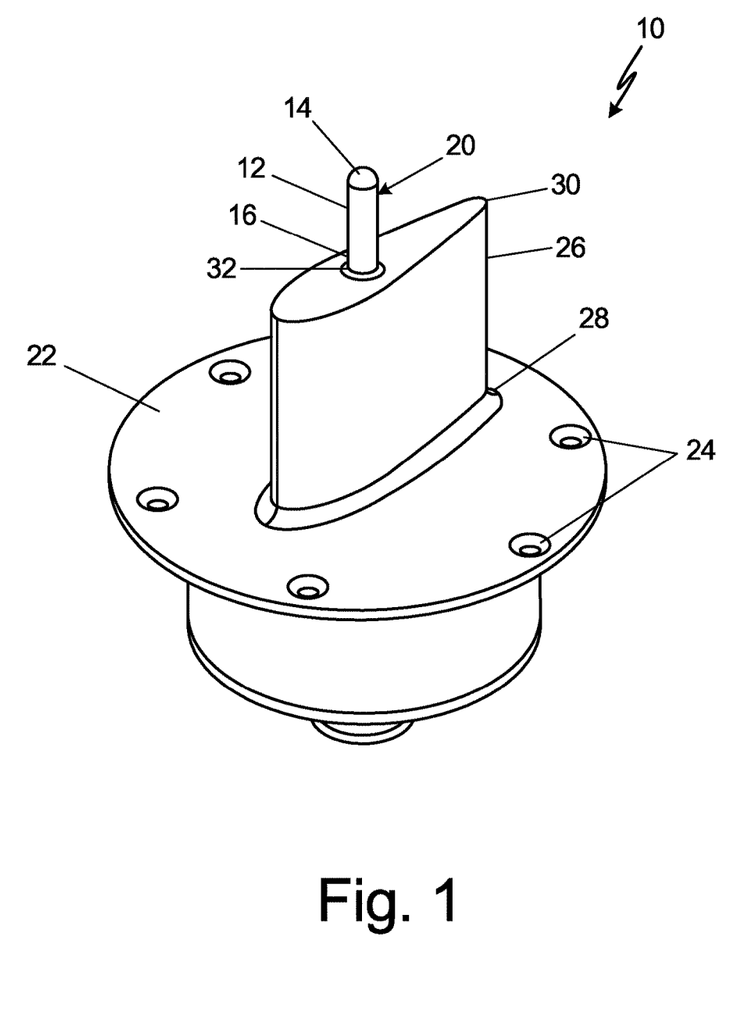
FIG. 1 is a perspective view of an embodiment of a magnetostrictive oscillating ice detector sensor.

FIG. 1 is a perspective view of an embodiment of magnetostrictive oscillating ice detector sensor 10. Magnetostrictive oscillating ice detector sensor 10 comprises single probe 12, mounting base 22, support strut 26, and probe gasket 32. Single probe 12 comprises probe first end 14, probe second end 16, probe inner side 18 (not shown), and probe outer side 20. Mounting base 22 has attachment points 24 near an edge of mounting base 22. Support strut 26 comprises strut first end 28 and strut second end 30.

Single probe 12 of magnetostrictive oscillating ice detector sensor 10 is a magnetostrictive oscillator probe. Magnetostriction is the property of certain materials to expand and contract in response to a changing magnetic field. Magnetostrictive materials include ferromagnetic materials, nickel alloys, nickel-iron-chromium alloys, and NiSPAN 902. Magnetostrictive oscillating ice detector sensor 10 functions by expanding and contracting single probe 12 under a variable magnetic field. As ice builds up on probe outer side 20, the added mass of ice on single probe 12 causes the frequency of single probe 12 to decrease while under the same oscillating magnetic field. Therefore, the thickness of the ice on single probe 12 can be approximated based on the decrease in frequency. Once the frequency has decreased beyond a set point, a heating element within single probe 12 will be turned on to heat single probe 12, thereby melting the accumulated ice and resetting single probe 12.

Single probe 12 comprises probe first end 14 that is opposite probe second end 16. Single probe 12 can be formed of a single cylindrical portion that extends from probe first end 14 towards probe second end 16. The cylindrical portion can be capped by a hemispherical portion at the probe first end 14. Hemispherical portion at probe first end 14 can reduce ice accumulation at probe first end 14. Single probe 12 has probe inner side 18 (not shown) and probe outer side 20. Probe outer side 20 contacts an exterior environment and during operation will accumulate ice. Probe outer side 20 can be smooth and polished to increase a smoothness of the surface. An increased smoothness of probe outer side 20 can reduce the time required to melt accumulated ice off probe outer side 20. Alternatively, a surface treatment can be applied to single probe 12 to increase a surface roughness of probe outer side 20. An increased roughness of probe outer side 20 can increase an ice accumulation rate.

Strut 26 has strut first end 28 opposite strut second end 30. Probe second end 16 connects to strut 26 at strut second end 30. The connection between probe second end 16 and strut second end 30 can be reinforced by probe gasket 32. Probe gasket 32 reduces leakage between probe second end 16 and strut second end 30. Specifically, probe gasket 32 can reduce the infiltration of water and other environmental contaminants between a gap between strut second end 30 and probe second end 16. Probe gasket 32 can be formed of rubber, plastic, metal, or other materials known to those of skill in the art to seal a gap. Probe gasket 32 allows single probe 12 to oscillate relative to strut 26 under an alternating magnetic field as described above. Strut 26 connects to mounting base 22 at strut first end 28. Strut 26 can be shaped as an airfoil. Alternatively, strut 26 can be cylindrically shaped. Alternatively, strut 26 can be oval shaped. Mounting base 22 can be affixed to a larger system via attachment points 24. Attachment points 24 can be used for reversible attachment mechanisms such as screws and bolts. Alternatively, attachment points 23 can be used for irreversible attachment mechanisms such as rivets, welding, or brazing. The larger system can be an aircraft, such as an airplane. Specifically, the mounting base can be affixed to a fuselage near a nose of an airplane. As discussed below, single probe 12 can be replaced with any probe head embodiment discussed below in FIGS. 2A-7B.

Figure 2A:
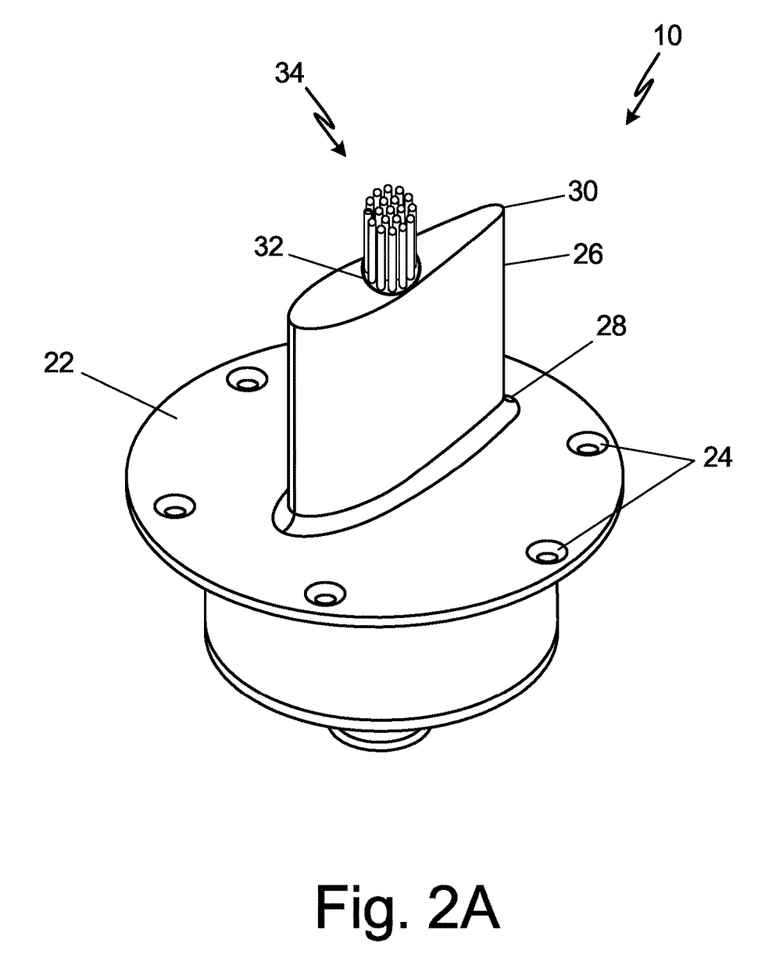
FIG. 2A is a perspective view of an embodiment of a magnetostrictive oscillating ice detector sensor with a probe head formed of a plurality of protrusions
Figure 2B:
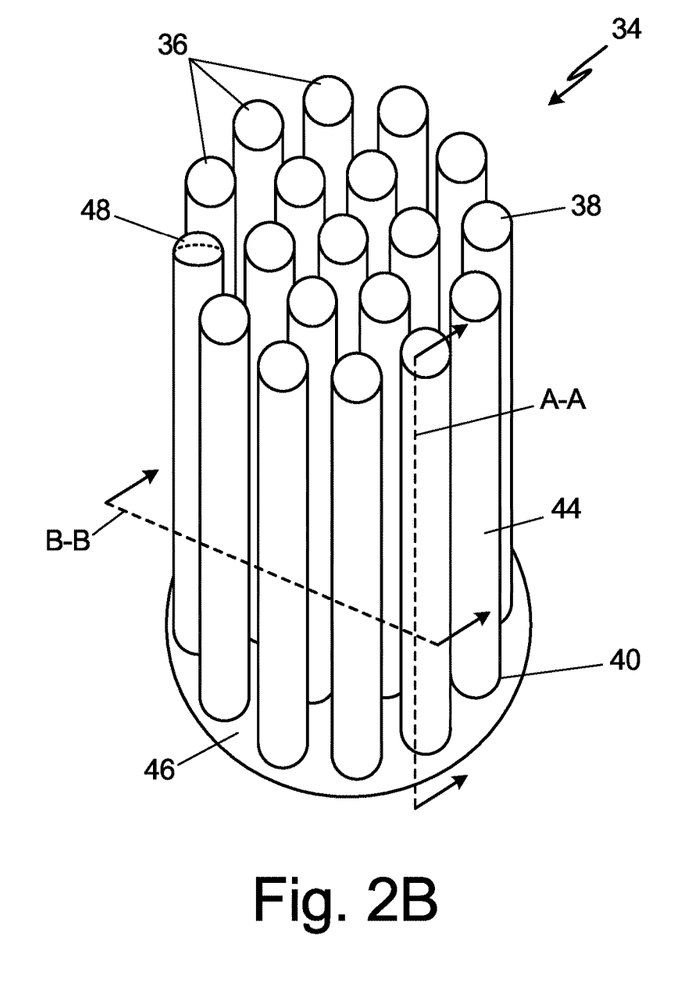
FIG. 2B is a perspective view of the probe head of FIG. 2A.
Figure 2C:
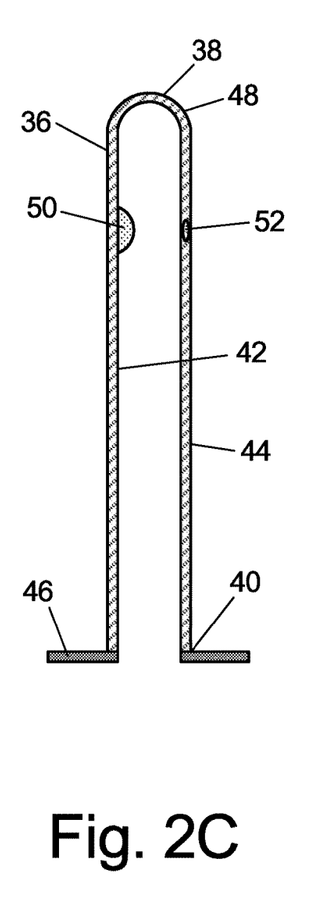
FIG. 2C is a cross-sectional view of a protrusion of the probe head of the magnetostrictive oscillating ice detector sensor of FIG. 2B taken along line A-A.

FIGS. 2A-2C disclose an embodiment for probe head 34 with a plurality of hollow Protrusions 6. FIG. 2A is a perspective view of an embodiment of magnetostrictive oscillating perspective view of probe head 34 of FIG. 2A. FIG. 2C is a cross-sectional view of protrusion 36 of probe head 34 of magnetostrictive oscillating ice detector sensor 10 of FIG. 2B taken along line A-A. As shown in FIGS. 2A-2C, each protrusion 36 of the plurality of hollow protrusions 36 includes first end 38, second end 40, inner side 42 (shown in FIG. 2B), outer side 44, hemispherical cap 48, inside heater 50 (shown in FIG. 2C), and wall heater 52 (shown in FIG. 2C). Probe head 34 also includes base 46.

Each protrusion 36 of the plurality of hollow protrusions 36 can extend from first end 38 to second end 40. Second end 40 of each protrusion 36 can be secured to base 46. Base 46 can be a flat disk as shown in FIG. 2B. In alternative embodiments, base 46 can be hemispherical, frustoconical, or any other shape known to those of skill in the art as being aerodynamic and having the ability to support the plurality of hollow protrusions 36. Probe gasket 32 (shown in FIG. 2A) extends around an outside perimeter of base 46 to protect magnetostrictive oscillating ice detector sensor 10 from environmental contaminants.

Since each protrusion 36 is hollow, each protrusion 36 includes inner side 42 and outer side 44. As discussed above with respect to probe outer side 20 of FIG. 1, outer side 44 contacts an exterior environment and will accumulate ice during operation. Outer side 44 can be smooth and polished. Increasing the smoothness of outer side 44 can reduce the time required to melt accumulated ice off outer side 44. Alternatively, a surface treatment can be applied to outer side 44 to increase a surface roughness of outer side 44. An increased roughness of outer side 44 can increase an ice accumulation rate of probe head 34. Each protrusion of plurality of hollow protrusions 36 can have hemispherical cap 48. Hemispherical cap 48 at first end 38 can reduce ice accumulation at probe first end 38, reducing a heating requirement for that region. The plurality of hollow protrusions 36 can be spaced and arranged in a distribution pattern. Distribution patterns will be discussed below with respect to FIGS. 4A-4C. In the embodiment of FIG. 2B, each protrusion 36 has a circular cross-sectional shape or profile. In some embodiments, each protrusion 36 of plurality of hollow protrusions 36 can have a different cross-sectional shape or profile. Alternative cross-sectional shapes will be discussed below with respect to FIGS. 5A-7B.

The cross-sectional shapes of each hollow protrusion 36 of the plurality of hollow protrusions 36 and the distribution pattern of the plurality of hollow protrusions 36 can be chosen and optimized to increase an ice formation rate that can improve the performance of magnetostrictive oscillating ice detector sensor 10. A discussion of potential calculations and simulations of a performance of magnetostrictive oscillating ice detector sensor 10 will be discussed further with respect to FIGS. 3A and 3B.

As best shown in FIG. 2C, each protrusion 36 of the plurality of hollow protrusions 36 can have inner heater 50 placed on inner surface 42. Alternatively, or in addition to inner heater 50, each protrusion 36 of plurality of hollow protrusions 36 can have wall heater 52 placed between inner surface 42 and outer surface 44. As discussed above with regard to single probe 12 of FIG. 1, as ice builds up on probe outer side 44, the added mass of ice on probe head 34 causes the frequency of probe head 34 to decrease while under the same oscillating magnetic field. Therefore, the thickness of the ice on probe head 34 can be approximated based on the decrease in frequency. Once the frequency has decreased beyond a set point, inside heater 50 and/or wall heater 52 will be turned on to heat probe head 34, thereby melting the accumulated ice and resetting probe head 34.

Probe head 34 can be manufactured through additive manufacturing, subtractive manufacturing electrical discharge machining or any other method known to those of skill in the art a being able to form complex 3D parts. Additive manufacturing comprises at least laying down a first layer of powder of a first material, sintering at least a portion of the first layer of powder, laying down a second layer of powder of a second material, and sintering at least a portion of the second layer of powder. Laying down a first layer of powder and sintering the first layer can be repeated as many times as required to achieve a desired first layer thickness. Laying down a second layer of powder and sintering the second layer of powder can be repeated as many times as required to achieve a desired second layer thickness. The first and second materials can be the same or different. Probe head 34 can be formed with the first layer of powder forming base 46 and the second layer of powder forming the plurality of hollow protrusions 36. The first material can be aluminum, an aluminum alloy, a magnetostrictive material, or any other material known to those of skill in the art as being able to be formed using additive manufacturing. The second material can be a magnetostrictive material or any other material known to those of skill in the art as being able to be formed using additive manufacturing. Subtractive manufacturing comprises at least machining probe head 34 from a larger block of material. In that example, subtractive manufacturing probe head 34 comprises at least machining the plurality of hollow protrusions 36 and base 46 from a larger block of material then combining the component parts through welding, brazing, or any other method known to those of skill in the art as being able to combine two parts. Electrical discharge machining comprises at least filling a space between a tool head and a workpiece with a dielectric fluid, increasing a voltage between the tool head and a workpiece such that the dielectric fluid enters dielectric breakdown, wherein after the dielectric fluid enters dielectric breakdown an arc occurs between the tool head and the workpiece removing material from the workpiece nearest the tool head. The tool head can then be moved to a new location and the process of flowing the dielectric fluid in, increasing a voltage, and producing an arc can be repeated until the component is completed.

Figure 3A:
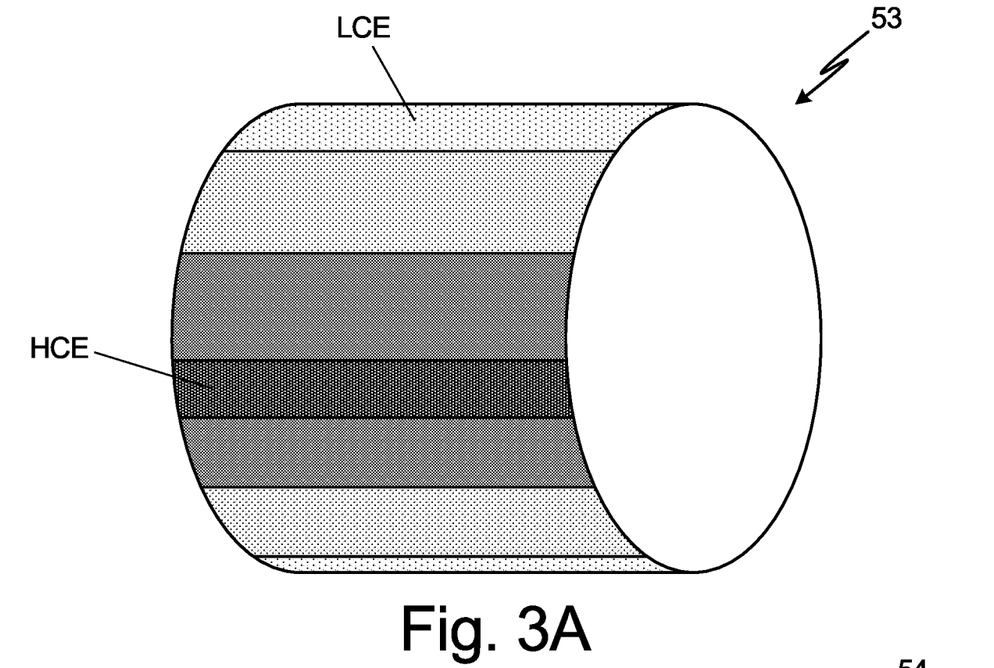
FIG. 3A is a perspective view of a Computational Fluid Dynamics simulation of the embodiment of the probe head of the magnetostrictive oscillating ice detector sensor of FIG. 1.
Figure 3B:
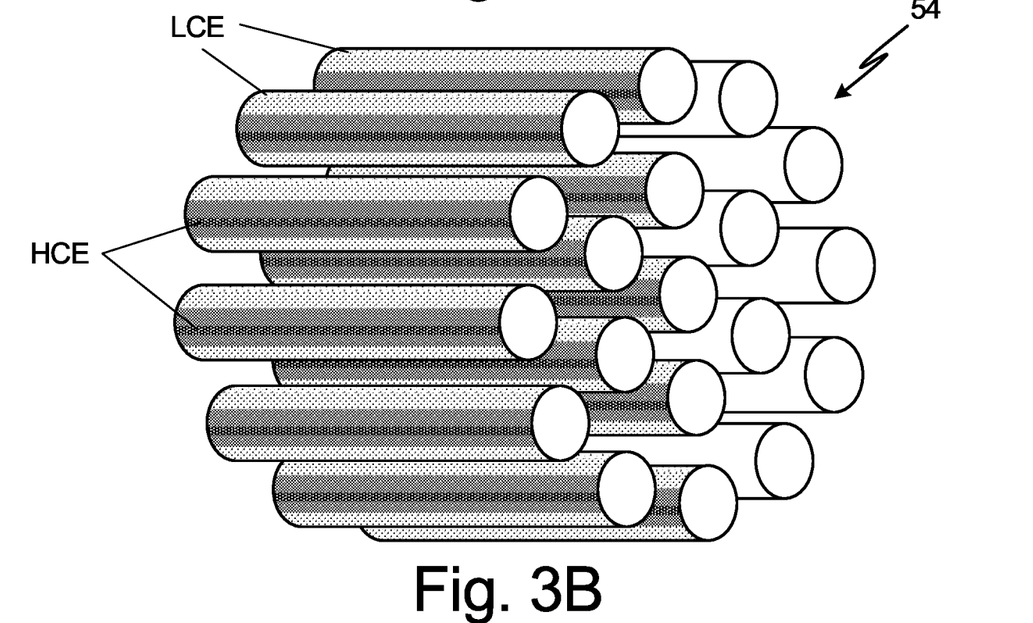
FIG. 3B is a perspective view of a Computational Fluid Dynamics simulation of the embodiment of the probe head of the magnetostrictive oscillating ice detector sensor of FIG. 2A.

FIGS. 3A and 3B are Computational Fluid Dynamics simulation of two embodiments of probe heads (12, 34) of magnetostrictive oscillating ice detector sensor 10. FIG. 3A is a perspective view of single probe simulation 53 of the embodiment of probe head 12 of magnetostrictive oscillating ice detector sensor 10 of FIG. 1. FIG. 3B is a perspective view of a multi-head probe simulation 54 of the embodiment of probe head 34 of the magnetostrictive oscillating ice detector sensor of FIG. 2A.

As best shown in FIG. 3A, single probe simulation 53 is a Computational Fluid Dynamics simulation of probe head 12. Local collection efficiencies vary over the surface of probe head 12. Perpendicular to a freestream flow, there is highest collection efficiency HCE. Highest collection efficiency is higher than lowest collection efficiency LCE. HCE represents a region of probe head 12 with the highest local collection efficiency and would have the greatest rate of ice accumulation during operation.

As best shown in FIG. 3B, multi-head probe simulation 54 is a Computational Fluid Dynamics simulation of probe head 34. As with probe head 12, local collection efficiencies vary over the surface of probe head 34. Perpendicular to a freestream flow, there is highest collection efficiency HCE. Highest collection efficiency is higher than lowest collection efficiency LCE. HCE represents a region of probe head 34 with the highest local collection efficiency and would have the greatest rate of ice accumulation during operation. HCE of probe head 34 is significantly higher than HCE of probe head 12. The local collection efficiency is significantly higher as there are more regions which have a small cylinder angle onto which the water droplets can impinge. The cylinder angle is defined as an angle measured from the center of the cylinder, between where a droplet impinges on the cylinder and a vector parallel to the direction of flow of the droplets. Cylinder angles have a much greater effect on smaller water droplets than on larger water droplets.

Ice formation rate can be represented as $\dot{M}=W_\infty V_\infty \beta_S A_S$, where $\dot{M}$ is the ice formation rate, $W_\infty$ is the freestream liquid water content, $V_\infty$ is the freestream airspeed, $\beta_S$ is the surface-averaged collection efficiency, and $A_S$ is the total surface area. Since $W_\infty V_\infty$ are variable in each situation, in order to increase the ice formation rate of any probe, $\beta_S A_S$ must be increased to improve the efficiency of the probe.

As can be seen in the comparison on FIGS. 3A and 3B, probe head shown in FIGS. 2A-2C improves the surface-averaged collection efficiency $\beta_S$ over single probe 12 shown in FIG. 1. The surface-averaged collection efficiency $\beta_S$ is increased by having more regions with a smaller cylinder angle. As can be seen in FIGS. 3A and 3B, probe head 34 has a nearly a 50% improvement in the collection efficiency for 10 μm water particles over single probe 12, improving the collection efficiency from less than 40% to over 60%. Probe head 34 also increases a surface area $A_S$ over single probe 12 by nearly 3× by having multiple smaller protrusions 36 instead of a single larger protrusion.

Figure 4A:
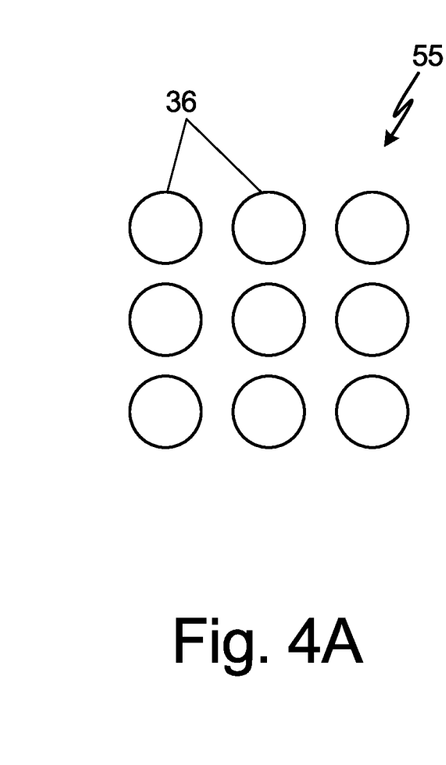
FIG. 4A is a cross-sectional view of the probe head of the magnetostrictive oscillating ice detector sensor of FIG. 2B taken along line B-B with the protrusions arranged in a square grid.
Figure 4B:
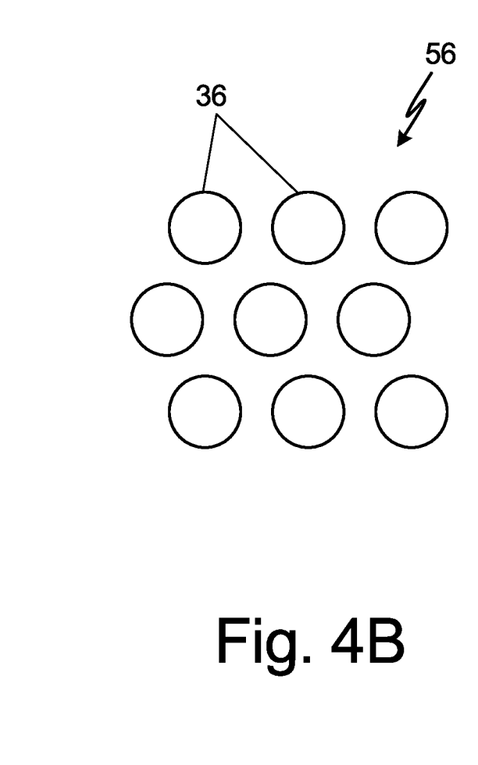
FIG. 4B is a cross-sectional view of the probe head of the magnetostrictive oscillating ice detector sensor of FIG. 2B taken along line B-B with the protrusions arranged in an offset square grid.
Figure 4C:
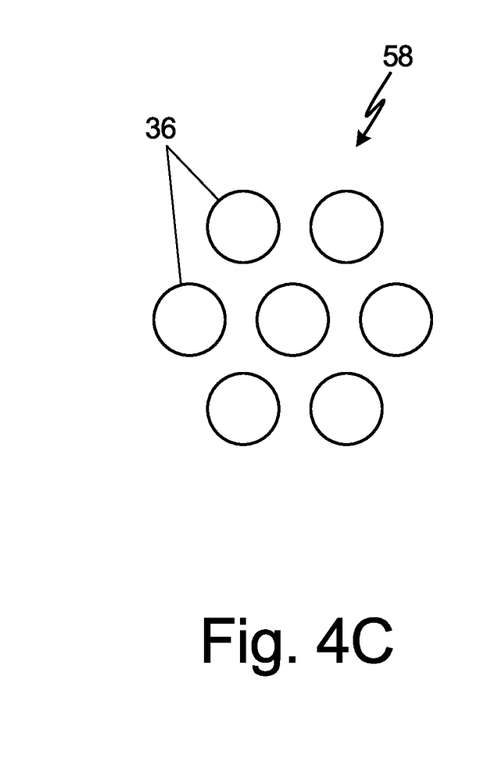
FIG. 4C is a cross-sectional view of the probe head of the magnetostrictive oscillating ice detector sensor of FIG. 2B taken along line B-B with the protrusions arranged in a hex grid.

FIGS. 4A-4C disclose alternative patterns of arrangement for the plurality of hollow protrusions 36. FIG. 4A is a cross-sectional view of probe head 34 of magnetostrictive oscillating ice detector sensor 10 of FIG. 2B taken along line B-B with the plurality of hollow protrusions 36 arranged in square grid pattern 55. FIG. 4B is a cross-sectional view of probe head 34 of magnetostrictive oscillating ice detector sensor 10 of FIG. 2B taken along line B-B with the plurality of hollow protrusions 36 arranged in offset square grid pattern 56. FIG. 4C is a cross-sectional view of probe head 34 of magnetostrictive oscillating ice detector sensor 10 of FIG. 2B taken along line B-B with the plurality of hollow protrusions 36 arranged in hex grid pattern 58.

As best shown in FIG. 4A, the plurality of hollow protrusions 36 can be arranged in square gird 55. Square grid 55 involves each protrusion 36 of the plurality of hollow protrusions 36 being in a row and a column. Each row and each column are straight without deviation or offset for any row or column. Square grid 55 can lead to an angle of attack dependence. An angle of attack dependence is a quality of the sensor where the sensor's detection performance depends on how the angle of attack aligns with sensor. Having an angle of attack dependence can reduce the sensor's ability to perform effectively in an airstream that rapidly changes between angles of attack; however, angle of attack dependence can be beneficial when the airstream changes its angle of attack little to none.

As best shown in FIG. 4B, the plurality of hollow protrusions 36 can be arranged in offset square grid distribution 56. Offset square grid distribution 56 involves each protrusion 36 of the plurality of hollow protrusions 36 being in a row and a column where at least one column and/or at least one row are offset from the other columns and rows, respectively. Offsetting at least one row or one column can reduce the angle of attack dependence slightly compared to FIG. 4A. In the embodiment shown in FIG. 4B, the second row is offset slightly from the other two rows. In alternative embodiments, either of the other rows or any of the columns could be offset.

As best shown in FIG. 4C, the plurality of hollow protrusions 36 can be arranged in hex grid distribution 58. Hex grid distribution 58 involves each protrusion 36 of the plurality of hollow protrusions 36 being in a row and a column where every other row is offset half of a distance between the centers of each protrusion 36 in the row and the rows are brought closer together compared to square grid distribution 55. Hex grid distribution 58 permits the pattern to be tessellated infinitely and completely removes angle of attack dependence. Hex grid distribution 58 can be optimal for situations where the angle of attack of the airstream changes frequently or rapidly.

The distribution patterns shown in FIGS. 4A-4C are not meant as limiting embodiments of distribution patterns. Alternative distributions of the plurality of hollow protrusions 36 are possible. These alternative distribution patterns can include removing some protrusions 36 of the plurality of hollow protrusions 36, adjusting an inter protrusion distance based on the row or the column, or any other modification those of skill in the art would contemplate to reduce a weight, reduce an angle of attack dependence, or increase a surface-averaged collection efficiency of probe head 34.

Figures 5A, 5B:
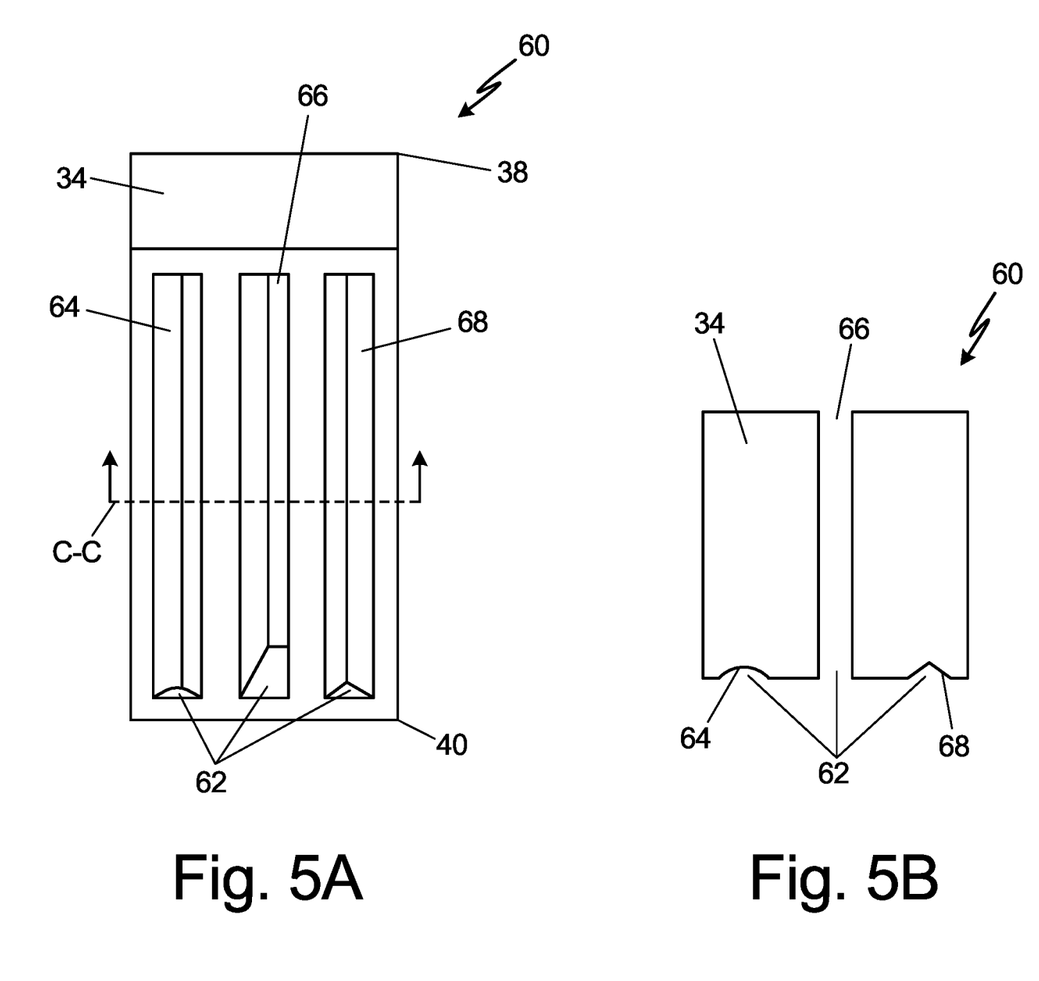
FIG. 5A is a perspective view of a square embodiment of a protrusion of a probe head of a magnetostrictive oscillating ice detector sensor.
FIG. 5B is a cross-sectional view of the protrusion of the probe head of the magnetostrictive oscillating ice detector sensor of FIG. 5A taken along line C-C.

FIGS. 5A-5B disclose an embodiment for a shape of probe head 34. FIG. 5A is a perspective view of square protrusion 60 embodiment of probe head 34 of magnetostrictive oscillating ice detector sensor 10. FIG. 5B is a cross-sectional view of square protrusion 60 of probe head 34 of magnetostrictive oscillating ice detector sensor 10 of FIG. 5A taken along line C-C. As shown in FIGS. 5A-5B, square protrusion 60 includes surface indentations 62. Surface indentations 62 can include semicircular indentations 64, through holes 66, and triangular indentations 68.

Each protrusion 36 of the plurality of hollow protrusions 36 shown in FIG. 2B can be replaced by square protrusion 60. Square protrusions 60 have a square cross-section. Alternatively, square protrusions 60 can have a rectangular cross-section. If more than one protrusion 36 of plurality of hollow protrusions 36 is replaced by square protrusions 60, square protrusions 60 can be rotated with respect to each other. Rotating square protrusions 60 relative to each other can reduce an angle of attack dependence. Further each square protrusion can have surface indentations 62 on any surface of square protrusions 60. These surface indentations and other surface indentations known to those of skill in the art have the ability to increase both a surface-averaged collection efficiency $β_S$ and a surface area $A_S$ over which the protrusion forms ice. Surface indentations 62 can include semicircular indentations 64, through holes 66, and triangular indentations 68. Semicircular indentations 64 are formed of a semicircular indentation into a surface of square protrusion 60. As shown in FIG. 5A, semicircular indentations 64 can run from near first end 38 to near second end 40. Alternatively, semicircular indentations 64 can run circumferentially around square protrusion 60. Through hole 66 is formed of a hole that extends from a first face of square protrusion 60 to a second face of square protrusion 60, perpendicular to a direction from first end 38 to second end 40. Through hole 66 can extend from near first end 38 to near second end 40. Triangular indentations 68 are formed of a triangular indentation into a surface of square protrusion 60. As shown in FIG. 5A, triangular indentations 68 can run a full length from first end 38 to second end 40. Alternatively, triangular indentations 68 can run circumferentially around square protrusion 60.

Figure 6A:
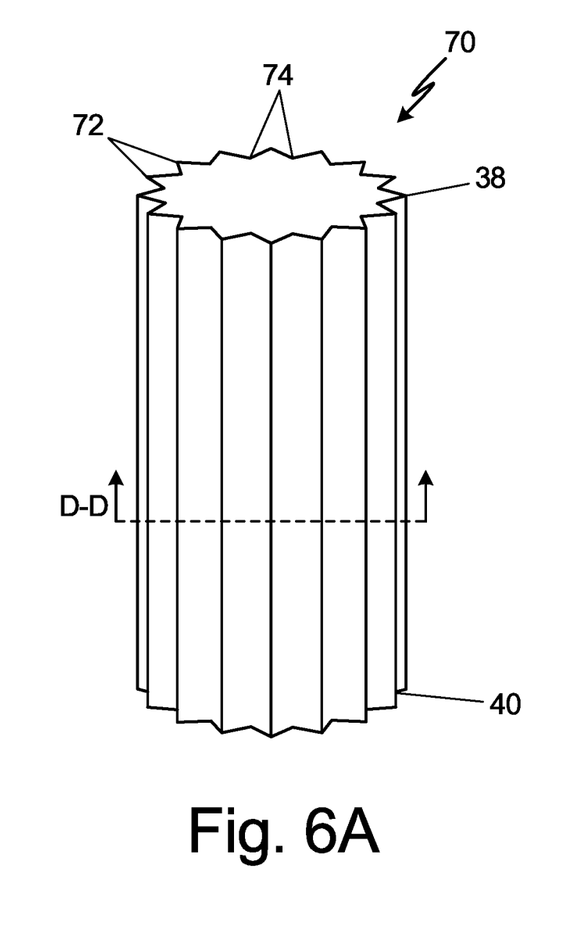
FIG. 6A is a perspective view of a multi-vertex embodiment of a protrusion of a probe head of a magnetostrictive oscillating ice detector sensor.
Figure 6B:
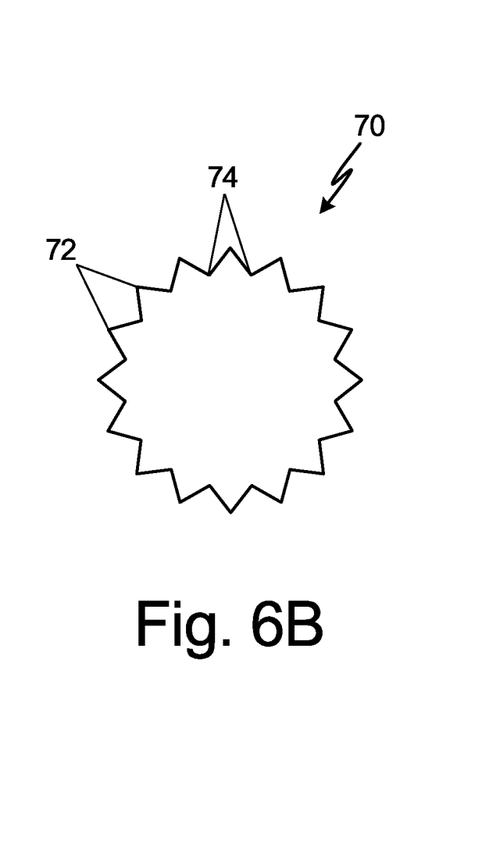
FIG. 6B is a cross-sectional view of the protrusion of the probe head of the magnetostrictive oscillating ice detector sensor of FIG. 6A taken along line D-D.

FIGS. 6A-6B disclose an alternative embodiment for a shape of probe head 34. FIG. 6A is a perspective view of star protrusion 70 for probe head 34 of magnetostrictive oscillating ice detector sensor 10. FIG. 6B is a cross-sectional view of star protrusion 70 of probe head 34 of magnetostrictive oscillating ice detector sensor 10 of FIG. 6A taken along line D-D.

Each protrusion of the plurality of hollow protrusions 36 shown in FIG. 2B can be replaced by star protrusion 70. Star protrusions 70 have a cross-section that is shaped as a multi-point star. The multipoint star comprises a circle with points 72 that extend out from the circle and valleys 74 that extend toward and contact the circle. There is an equal number of points 72 as there are valleys 74. The embodiment shown in FIGS. 6A-6B has 16 points. Alternative embodiments can have any number of points 72 including 2 points, 3 points, 5 points, 6 points, 7 points, 8 points, 10 points, 12 points, 14 points, less than 6 points, less than 16 points, less than 24 points, or more than 6 points. Star protrusions 70 can improve the surface-averaged collection efficiency $β_S$ and increase a surface area $A_S$, while simultaneously reducing the weight and reducing angle of attack dependence. Star protrusions 70 can be symmetrical or non-symmetrical. As shown in FIGS. 6A-6B, points 72 and valleys 74 of star protrusion 70 have sharp edges. In alternative embodiments, points 72 and valleys 74 of star protrusion 70 can be rounded to reduce edge effects.

Figure 7A:
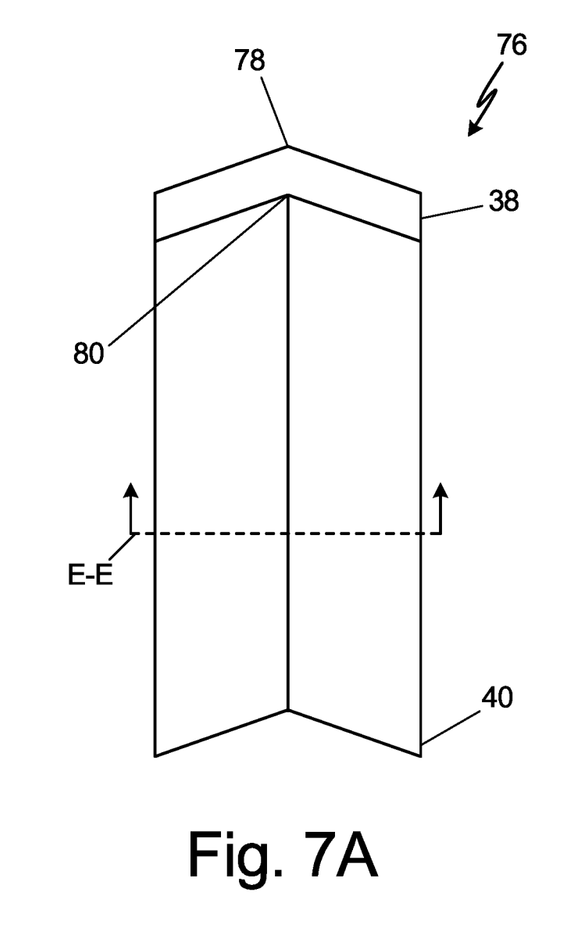
FIG. 7A is a perspective view of a chevron embodiment of a protrusion of a probe head of a magnetostrictive oscillating ice detector sensor.
Figure 7B:
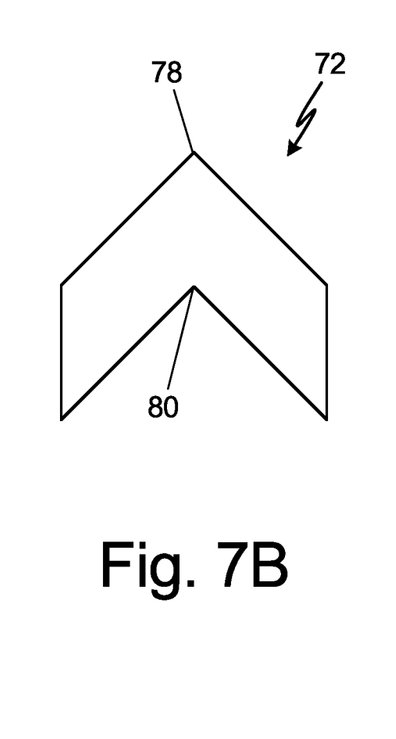
FIG. 7B is a cross-sectional view of the protrusion of the probe head of the magnetostrictive oscillating ice detector sensor of FIG. 7A taken along line E-E.

FIGS. 7A-7B disclose an alternative embodiment for a shape of probe head 34. FIG. 7A is a perspective view of chevron protrusion 76 for another embodiment of probe head 34 of magnetostrictive oscillating ice detector sensor 10. FIG. 7B is a cross-sectional view of chevron protrusion 76 of probe head 34 of the magnetostrictive oscillating ice detector sensor of FIG. 7A taken along line E-E.

Each protrusion of the plurality of hollow protrusions 36 shown in FIG. 2B can be replaced by chevron protrusion 76. Chevron protrusions 76 have a cross-section that is shaped as a chevron. The chevron comprises apex 78 opposite concavity 80. A front surface of chevron protrusion 76 extends from apex 78 in the direction of concavity 80 at a nonzero angle off of an axis formed between apex 78 and concavity 80. The back surface of chevron protrusion 76 extends parallel to the front surface. The front and back surfaces are connected by side surfaces. Chevron protrusions 76 can improve the surface-averaged collection efficiency $β_S$ and increase a surface area $A_S$, while simultaneously reducing the weight. Chevron protrusions 76 can have an angle of attack dependence. Chevron protrusions 76 can be most effective if the airstream impinges on apex 78 or concavity 80 of chevron protrusions 76 instead of impinging on the side surfaces of chevron protrusions 76. Chevron protrusions 76 can be symmetrical or non-symmetrical across the center line formed from apex 78 to concavity 80. As shown in FIGS. 7A-7B, apex 78 and concavity 80 of chevron protrusion 76 have sharp edges. In alternative embodiments, apex 78 and concavity 80 of chevron protrusion 76 can be rounded.

In FIGS. 5A-7B, three different cross sections of the plurality of hollow protrusions 36 are disclosed. These cross-sections comprise square cross sections, multi-point star cross-sections, and chevron cross-sections. In alternative embodiments, the cross-sections can be ellipses, airfoils, triangles, rectangles, parallelograms, trapezoids, *rhombi*, pentagons, hexagons heptagons, octagons, nonagons, decagons, any other cross-sectional shape, or any combination of cross-sectional shapes.

Figure 8:
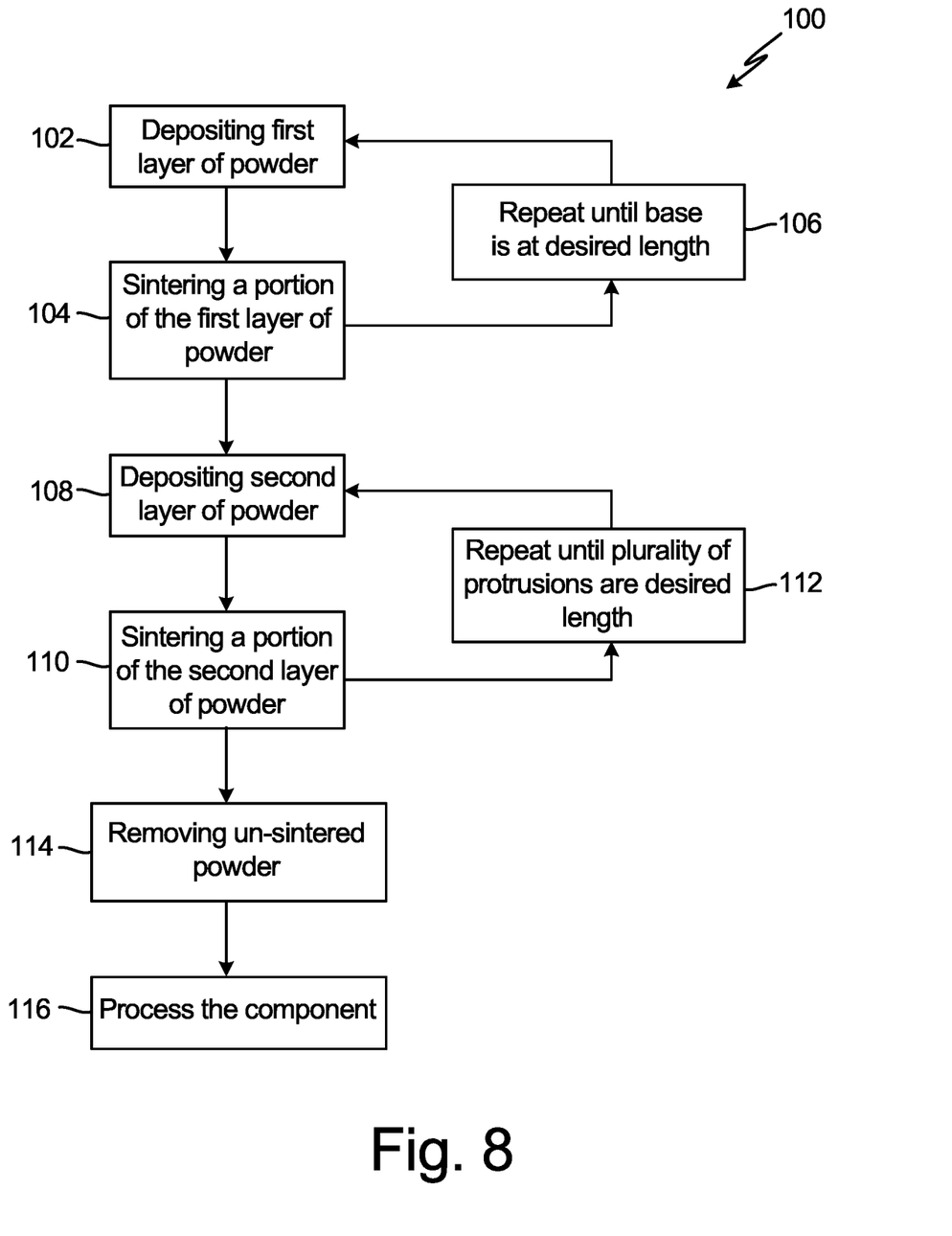
FIG. 8 is a flow chart of a method of forming a probe head of a magnetostrictive oscillating ice detector sensor with protrusions via additive manufacturing.

FIG. 8 is a flow chart of method 100 of forming probe head 34 of magnetostrictive oscillating ice detector sensor 10 with the plurality of hollow protrusions 36 via additive manufacturing. Method 100 comprises depositing a first layer of powder 102, sintering a portion of the first layer of powder 104, repeating the depositing and sintering of the first layer of powder 106, depositing a second layer of powder 108, sintering a portion of the second layer of powder 110, repeating the depositing and sintering of the second layer of powder 112, removing un-sintered powder 114, and completing post-processing steps 116.

Base 46 can be formed by depositing a first layer of powder 102 and sintering a portion of the first layer of powder 104. Depositing a first layer of powder 102 comprises laying a first layer of metallic powder onto a powder fusion bed of a powder fusion machine. The first layer of powder can be a first material. The first material can be an aluminum alloy, a magnetostrictive alloy, or any other material known to those of skill in the art as being able to be formed using additive manufacturing. The first layer of powder can be a first thickness which is uniform throughout the first layer. Sintering a portion of the first layer of powder 104 comprises projecting a high-powered laser at pre-determined regions of the first layer of powder. The laser sinters the powder together in the pre-determined regions forming a continuous part in each of the predetermined regions. Once sintered, the first layer of powder forms base 46 of probe head 34. Steps 102 and 104 can be repeated 106 until base 46 reaches a desired height. Repeating the depositing and sintering of the first layer of powder 106 can be completed as many times as required to reach the desired height of base 46.

The plurality of hollow protrusions 36 can be formed onto base 46. The plurality of hollow protrusions 36 are formed by depositing a second layer of powder 108 onto the first layer of powder and sintering a portion of the second layer of powder 110 at pre-determined regions of the second layer of powder. The second layer of powder is applied to the first layer of powder. The second layer of powder can be a second material. The second material can be different than the first material. Alternatively, the second material can be the same as the first material. The second material can be a magnetostrictive alloy, or any other material known to those of skill in the art as being able to be formed using additive manufacturing and able to oscillate under a magnetic field. The second layer of powder can be a second thickness which is uniform throughout the second layer. The second layer of power is sintered with a high-powered laser. The laser sinters the powder together in the pre-determined regions thereby forming a continuous part throughout each of the predetermined regions. Once sintered, the second layer of powder forms the plurality of hollow protrusions 36 of probe head 34. Steps 108 and 110 can be repeated 112 until the plurality of hollow protrusions 36 reach a desired height. Repeating the depositing and sintering of the first layer of powder 112 can be completed as many times as required to reach the desired height of plurality of hollow protrusions 36.

Once base 46 and the plurality of hollow protrusions 36 are formed, any powder from the first layer of powder or the second layer of powder which was not sintered can be removed. Removing un-sintered powder 114 comprises projecting a high velocity stream of fluid towards base 46 and plurality of hollow projections 36. The high velocity stream of fluid carries away the un-sintered powder while leaving the sintered portions undisturbed. The fluid can be air, nitrogen gas, deionized water, water, oil, or any other fluid known to those of skill in the art as being utilized for removing un-sintered powder from an additively manufactured component. Alternatively, removing un-sintered powder 114 can comprise brushing away the un-sintered powder. Once the un-sintered powder has been removed 114, post-processing steps 116 can be completed. Completing post-processing steps 116 comprises smoothing a surface of base 46 and the plurality of hollow protrusions 36, applying a coating to the surface of base 46 and the plurality of hollow protrusions 36, installing the probe head 34 into a larger assembly, or combinations thereof. Smoothing a surface of base 46 and the plurality of hollow protrusions 36 comprises mechanically removing surface variations through grinding or sanding. Alternatively, smoothing a surface of base 46 and plurality of hollow protrusions 36 can comprise projecting a high velocity stream of smaller particles towards the surface of base 46 and the plurality of hollow protrusions 36. Applying a coating to the surface of base 46 and the plurality of hollow protrusions 36 comprises spraying a coating material onto the surface of base 46 and the plurality of hollow protrusions 36. The coating material can be any material known to those of skill in the art as being able to be applied to an additively manufactured part. Installing probe head 34 into a larger assembly comprises installing probe head 34 into magnetostrictive oscillating ice detector sensor 10 as described above with regard to FIG. 1.

Discussion of Possible Embodiments

The following are non-exclusive descriptions of possible embodiments of the present invention.

A probe head of a magnetostrictive oscillator. . . .

The probe head of a magnetostrictive oscillator of the preceding paragraph can optionally include, additionally and/or alternatively, any one or more of the following features, configurations and/or additional components:

A base and a plurality of hollow protrusions extending from the base. Each protrusion of the plurality of hollow protrusions includes a first end, a second end opposite the first end, where the second end is connected to the base, an inner side, and an outer side opposite the inner side.

A further embodiment of the foregoing probe head of a magnetostrictive oscillator, wherein one or more of the plurality of hollow protrusions comprises a hemispherical portion connected to the first end.

A further embodiment of any of the foregoing probe heads of a magnetostrictive oscillators, wherein the probe head is additively manufactured.

A further embodiment of any of the foregoing probe heads of a magnetostrictive oscillators, wherein the probe head is formed of a nickel-iron-chromium alloy.

A further embodiment of any of the foregoing probe heads of a magnetostrictive oscillators, wherein each protrusion of the plurality of hollow protrusions comprises a heater on the inner side.

A further embodiment of any of the foregoing probe heads of a magnetostrictive oscillators, wherein each protrusion of the plurality of hollow protrusions comprises a heater between the inner side and the outer side.

A further embodiment of any of the foregoing probe heads of a magnetostrictive oscillators, wherein each protrusion of the plurality of hollow protrusions comprises a circular cross-sectional profile.

A further embodiment of any of the foregoing probe heads of a magnetostrictive oscillators, wherein each protrusion of the plurality of hollow protrusions comprises a square cross-sectional profile.

A further embodiment of any of the foregoing probe heads of a magnetostrictive oscillators, wherein each protrusion of the plurality of hollow protrusions comprises a cross-sectional profile with 2 or more vertices.

A further embodiment of any of the foregoing probe heads of a magnetostrictive oscillators, wherein each protrusion of the plurality of hollow protrusions comprises a cross-sectional profile that is chevron shaped.

A further embodiment of any of the foregoing probe heads of a magnetostrictive oscillators, wherein the probe head comprises one or more indentations on the outer side.

A further embodiment of any of the foregoing probe heads of a magnetostrictive oscillators, wherein the plurality of hollow protrusions is arranged in a square grid.

A further embodiment of any of the foregoing probe heads of a magnetostrictive oscillators, wherein the plurality of hollow protrusions is arranged in a offset square grid.

A further embodiment of any of the foregoing probe heads of a magnetostrictive oscillators, wherein the plurality of hollow protrusions is arranged in a hex grid.

A method of forming a probe head of a magnetostrictive oscillator comprising.

The method of forming a probe head of a magnetostrictive oscillator of the preceding paragraph can optionally include, additionally and/or alternatively, any one or more of the following features, configurations and/or additional components:

Depositing a base layer which includes depositing a first layer of powder of a first material and sintering a portion of the first layer of powder. The method further includes depositing a probe head layer which includes depositing a second layer of powder on the base layer, wherein the second layer of powder is a second material and sintering a plurality of different points of the second layer of powder to form a plurality of protrusions. The method further includes removing any powder from the first layer of powder and the second layer of powder that was not sintered.

A further embodiment of the foregoing method, wherein the second material is a magnetostrictive material.

An ice detector.

The ice detector of the preceding paragraph can optionally include, additionally and/or alternatively, any one or more of the following features, configurations and/or additional components:

A mounting base, a support strut connected to the mounting base, and a magnetostrictive oscillator probe head connected to the support strut opposite the mounting base. The magnetostrictive oscillator probe head comprises a plurality of hollow protrusions.

A further embodiment of the foregoing mounting base, wherein the mounting base connects to an aircraft.

A further embodiment of any of the foregoing mounting bases, wherein the magnetostrictive oscillator probe head is additively manufactured.

A further embodiment of any of the foregoing mounting bases, wherein the ice detector further comprises a heater.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A probe head of a magnetostrictive oscillator comprising:
    A base; and
    a plurality of hollow protrusions extending from the base, wherein each protrusion of the plurality of hollow protrusions comprises:
    a first end;
    a second end opposite the first end, wherein the second end is connected to the base;
    an inner side;
    an outer side opposite the inner side; and
    one or more indentations on the outer side.

2. The probe head of claim 1, wherein one or more of the plurality of hollow protrusions comprises a hemispherical portion connected to the first end.

3. The probe head of claim 1, wherein the probe head is additively manufactured.

4. The probe head of claim 1, wherein the probe head is formed of a nickel-iron-chromium alloy.

5. The probe head of claim 1, wherein each protrusion of the plurality of hollow protrusions comprises a heater on the inner side.

6. The probe head of claim 1, wherein each protrusion of the plurality of hollow protrusions comprises a heater between the inner side and the outer side.

7. The probe head of claim 1, wherein each protrusion of the plurality of hollow protrusions comprises a circular cross-sectional profile.

8. The probe head of claim 1, wherein each protrusion of the plurality of hollow protrusions comprises a square cross-sectional profile.

9. The probe head of claim 1, wherein each protrusion of the plurality of hollow protrusions comprises a cross-sectional profile with 2 or more vertices.

10. The probe head of claim 1, wherein each protrusion of the plurality of hollow protrusions comprises a cross-sectional profile that is chevron shaped.

11. The probe head of claim 1, wherein the plurality of hollow protrusions is arranged in a square grid.

12. The probe head of claim 1, wherein the plurality of hollow protrusions is arranged in a offset square grid.

13. The probe head of claim 1, wherein the plurality of hollow protrusions is arranged in a hex grid.

14. An ice detector comprising:
    a mounting base;
    a support strut connected to the mounting base;
    a magnetostrictive oscillator probe head connected to the support strut opposite the mounting base, wherein the magnetostrictive oscillator probe head comprises a plurality of hollow protrusions, wherein each protrusion of the plurality of hollow protrusions comprises an outer side and one or more indentations formed on the outer side.

15. The ice detector of claim 14, wherein the mounting base connects to an aircraft.

16. The ice detector of claim 14, wherein the magnetostrictive oscillator probe head is additively manufactured.

17. The ice detector of claim 14, wherein the ice detector further comprises a heater.

* * * * *